US00RE38402E

(19) United States
(12) Reissued Patent
Stephens et al.

(10) Patent Number: US RE38,402 E
(45) Date of Reissued Patent: Jan. 27, 2004

(54) OPTICAL LENSES WITH SELECTIVE TRANSMISSIVITY FUNCTIONS

(75) Inventors: James B. Stephens, Glendale, CA (US); Charles G. Miller, deceased, late of Pasadena, CA (US), by Ann S. Miller, Executrix

(73) Assignee: SunTiger, Inc., Calabasas, CA (US)

(21) Appl. No.: 09/441,359

(22) Filed: Nov. 16, 1999

Related U.S. Patent Documents

Reissue of:
(64) Patent No.: 4,952,046
Issued: Aug. 28, 1990
Appl. No.: 07/224,060
Filed: Jul. 25, 1988

U.S. Applications:
(63) Continuation-in-part of application No. 06/352,706, filed on Feb. 26, 1982, now abandoned.

(51) Int. Cl.[7] ..... G02C 7/10; G02C 7/04
(52) U.S. Cl. ..... 351/163; 351/162
(58) Field of Search ..... 351/163, 159, 351/162, 161, 160 R, 160 H, 164, 165

(56) References Cited

U.S. PATENT DOCUMENTS

| | | | |
|---|---|---|---|
| 2,370,697 | A | 3/1945 | Tilyer |
| 2,444,976 | A | 7/1948 | Brown |
| 2,631,499 | A | 3/1953 | Riley |
| 2,643,982 | A | 6/1953 | Riley |

(List continued on next page.)

FOREIGN PATENT DOCUMENTS

| | | |
|---|---|---|
| DE | 2307602 | 8/1974 |
| WO | WO8100769 | 9/1980 |

OTHER PUBLICATIONS

Borgwardt et al., *Spectral Transmission Characteristics of Tinted lenses*, Arch Opthalmol, vol. 99, pp. 293–297 (1981).
Buchele, *Veiling Glare Reduction Methods Compared for Ophthalmic Applications*, Applied Optics, vol. 20, pp. 3787–3791 (1981).
Clark, *Color in Sunglass Lenses*, American Journal of Optometry and Archives of American Academy of Optometry, pp. 825–838 (1969).
Coblentz et al., *Spectrial–Transimissive Properties and Use of Colored Eye–Protective Glasses*, Circular of the National Bureau of Standards, U.S. Department of Commerce (Jun. 1, 1938).
Cutters Exchange Inc., *Contrast Control Safety Goggles*, (1968).
Dobrowolski et al., *Colored Filter Glasses: An Intercomparison of glasses Made By Different Manufacturers*, Applied Optics, vol. 16(6) (1977).
Drew, *Ultraviolet Radiation and the Ocular Media*, Optical Management (1981).
Emsley, *Filters: Absorptive and Thin Film*, The Optician, pp. 543–558, 552, 571–576, 592–600 (1959).
Sherr et al., *New Plastics Absorb at Laser Wavelengths*, LF (1969).
Sliney, *Introduction to the Optical Spectrum*, Non–ionizing Radiation–Proceedings of an ACGIH Topical Symposium, Nov. 26–28, 1979, pp. 123–128.

(List continued on next page.)

*Primary Examiner*—Scott J. Sugarman
(74) *Attorney, Agent, or Firm*—Banner & Witcoff, Ltd.

(57) ABSTRACT

An opthalmic spectacle or contact sharp cut-on orange lens that improves visual acuity and substantially reduces eye damage in a bright sunlit environment. The lenses substantially eliminate ultraviolet radiation and blue light shorter than [515] *520* nm. The ultraviolet radiation has been implicated as a cause of cateractogenisis. The blue light is implicated in senile macular degenerations, night blindness and snow blindness. The lens is substantially transparent to wavelengths greater than [636] *600* nm which are most useful for high visual acuity in bright sunlit environment.

10 Claims, 1 Drawing Sheet

U.S. PATENT DOCUMENTS

| | | | |
|---|---|---|---|
| 3,269,267 | A | 8/1966 | Collins |
| 3,382,183 | A | 5/1968 | Donoian et al. |
| 3,460,960 | A | 8/1969 | Francel et al. |
| 3,571,649 | A | 3/1971 | Bush, Jr. |
| 3,588,216 | A | 6/1971 | Bloom |
| 3,591,263 | A | 7/1971 | Esterson |
| 3,711,417 | A | 1/1973 | Schuler |
| 3,745,032 | A | 7/1973 | Miller et al. |
| 3,754,816 | A | 8/1973 | Ritze |
| 4,043,637 | A | 8/1977 | Hovey |
| 4,134,644 | A | 1/1979 | Marks et al. |
| 4,240,836 | A | 12/1980 | Borrelli et al. |
| 4,330,177 | A | 5/1982 | Miller et al. |
| 4,740,070 | A | 4/1988 | Vance |

OTHER PUBLICATIONS

Sliney et al., *Safety Standards and Measurent Techniques for High Intensity Light Sources*, Vision Research, vol. 20, pp. 1133–1141 (1980).

Sliney et al., *Safety with Lasers and Other Optical Sources*, New York, Plenum Press (1980).

Sliney et al., *Semitransparent Curtains for Control of Optical Radiation Hazards*, Applied Optics, vol. 20 (14) pp. 2352–2366 (1981).

Sliney, *Standards for Use of Visible and Nonvisible Radiation on the Eye*, American Journal of Optometry & Physiological Optics, pp. 278–286 (1983).

Wolbarsht, *The Function of Intraocular Color Filters*, Federation Proceedings, vol. 35(1), pp. 44–50 (1976).

Wolbarsht et al., *Retinitis Pigmentosa: Clinical Management Based on Current Concepts*, Retinitis Pigmentosa, pp. 181–195, New York, Plenum Press (1976).

Wyszecki, *Theorectical Investigation of Colored Lenses for Snow Goggles*, Journal of the Optical Society of America, vol. 46 (12), pp. 1071–1074 (1956).

*The Spectral–Transmissive Properties of Plastics For Use In Eye Protection*, American Standards Association, Subcommitee on Transmissive Properties of Plastics (1955).

OPTICAL LENSES WITH SELECTIVE TRANSMISSIVITY FUNCTIONS

Matter enclosed in heavy brackets [ ] appears in the original patent but forms no part of this reissue specification; matter printed in italics indicates the additions made by reissue.

CROSS REFERENCE TO RELATED APPLICATIONS

This application is a *reissue of application Ser. No. 224,060 filed Jul. 25, 1988, which was a* continuation-in-part of application serial number 352,706 filed Feb. 26, 1982 now abandoned.

TECHNICAL FIELD

This invention relates to lenses and more particularly to lenses having specific transmission properties that increase visual acruity and reduce ultraviolet and blue light hazards.

BACKGROUND ART

There is a growing awareness that wavelengths of sunlight are harmful to the eye. For example, light of the color blue, more more accurately stated, light with wavelengths between 400 nm and [515] *520* nm are harmful over a long period of time. This is a rather surprising conclusion in view of the widespread presence of blue light, for example in the sky. However, tests have shown that blue light does gradually destroy the supply of visual purple which the retina of the human eye possesses, and can lead to senile macular degeneration, night blindness and snow blindness among other problems.

The adverse effects of light having wavelengths in the region between 400–[515] *520* nm are only recently beginning to be fully recognized and at least partially understood. For many years, persons in the outdoors have attempted to protect their eyes with "dark glasses", and such glasses, often called "sun glasses" have come in many colors, and with many explanations of their functions. Still, with only a few exceptions, such as special lenses for welders and skiers and filters for cameras and scientific purposes, their effort has been more to reduce the intensity of light transmitted, rather than to filter out any particular wavelength or group of wavelengths.

The special lenses which have existed have severely limited properties, because they are made of glass, and additives for the purpose of modifying the transmissivity and must be compatible with the high temperatures used to make the glass. The range of properties of such substances is very narrow, and does not approach the versatility of organic dyestuffs for this purpose. However, such dyestuffs are destroyed by the temperatures used in making the glass. Accordingly, while glass interference coated filters and lenses with special transmissive properties do exist, they are usually quite costly, and fail to provide the advantages of this invention as to low cost, and to versatility and breadth of function and beneficial effect.

A search of the prior art did not disclose any patents that read directly on the claims of the instant invention however, the following patents were considered related:

| PATENT NUMBER | INVENTOR | ISSUED |
|---|---|---|
| 2,307,602 (German) | Krumeich, et al | 29 Aug. 1974 |
| 3,745,032 | Miller, et al | 10 Jul. 1973 |
| 3,571,649 | Bush, Jr. 23 | Mar. 1971 |
| 3,460,960 | Francel, et al | 12 Aug. 1969 |

The Krumeich patent is primarily directed to correcting impaired color vision with lenses having a selective transmission function. The patent limits transmission in the blue range while allowing almost complete transmission in the red range. As can be seen in FIG. 1 of the patent, wavelengths less than about 490 nm are substantially cut-off having about 0.01% transmission. Light having wavelengths of about 550 nm or longer has at least about 10% transmission. Additionally, light having wavelengths of about 600 nm or longer has at least a 70% transmission.

The Miller patent discloses a glass composition that has improved ultraviolet and infrared transmittance characteristics. The invention is especially useful in manufacturing lenses for housing infrared and ultra-violet or radio-frequency detectors as are used in missile systems.

The Bush patent discloses selective color filtration devices for underwater viewing or photography. The patent discloses a predetermined color-selective light-filtering coating on a light source that is used for underwater viewing or photography. For example, to absorb light in the blue-green end of the visible spectrum and to pass the red, orange and yellow wavelengths, in accordance with a predetermined formula, the coating corrects to some extent the filtering effect caused by the water and by the particles suspended in the water. By following the teachings of the present invention, underwater objects may be photographed in more natural colors, and without the usual bluish-greenish tinge which normally accompanys objects that are photographed by present day equipment.

The Francel, et al patent discloses a method for coating a vitreous substrate with a fluid coating composition. The coating imparts to an otherwise clear and/or transparent glass substrate the light transmittance characteristics of an amber glass. Amber glass, which is widely used for a variety of applications such as reflectors, insulators and glass containers, inherently screens out appreciable percentages of lightwaves in the visible spectrum. For example, at 400 nm, the range of light transmission is between 1.53–7.0%; at 450 nm between 3.5–16.0%; and at 500 nm between 7.0–27.0%.

DISCOURSE OF THE INVENTION

The lens of the instant invention is made of a plastic material into which is incorporated an organic orange dye 3. This dye has the property of allowing the lens to transmit at least 90% of the visible sunlight with wavelengths longer than [636] *600* nm and block more than 99% of all sunlight with wavelengths shorter than [515] *520* nm.

The inventive lens are designed to improve visual acuity and to specifically eliminate ultraviolet (uv) and reduce blue light hazard.

The elimination of uv radiation can help avoid cataractogenisis, better known as cataracts; and the reduction of blue light can help avoid senile mascular degeneration which is especially prevalent in humans having outdoor occupations.

The lens is also designed to improve visual acuity in a bright sunlit environment by blocking the following photons:

violet and blue light that is preferentially scattered by atmospheric particles;

violet and blue light that is preferentially scattered by particles within the vitreous humor of the eye;

violet and blue light that is focused in front of the retina by the simple lens of the eye;

violet and blue light during the day that preferentially bleaches the Rhodopson in the rod structure of the retina thus reducing night vision;

ultraviolet radiation that causes the lens and vitreous humor of the eye to fluores and reduce the scene contrast that is projected onto the retina.

In view of the above disclosure, it is the primary object of the invention to provide a lens that is worn in front of the eyes by humans in an outdoor, sunlit environment. The lenses provide a filter barrier to photons that are deleterious to the eyes.

A further object of the invention is to provide a lens that transmits visible light most useful for high visual acuity in brightly sunlit environment.

An additional object of the invention is to provide a choice of sharp cut-on filtering lenses within the narrow range of 35 nm.

Still another object of the invention is to have that can be manufactured in the form of a spectacle lens or a contact lens.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
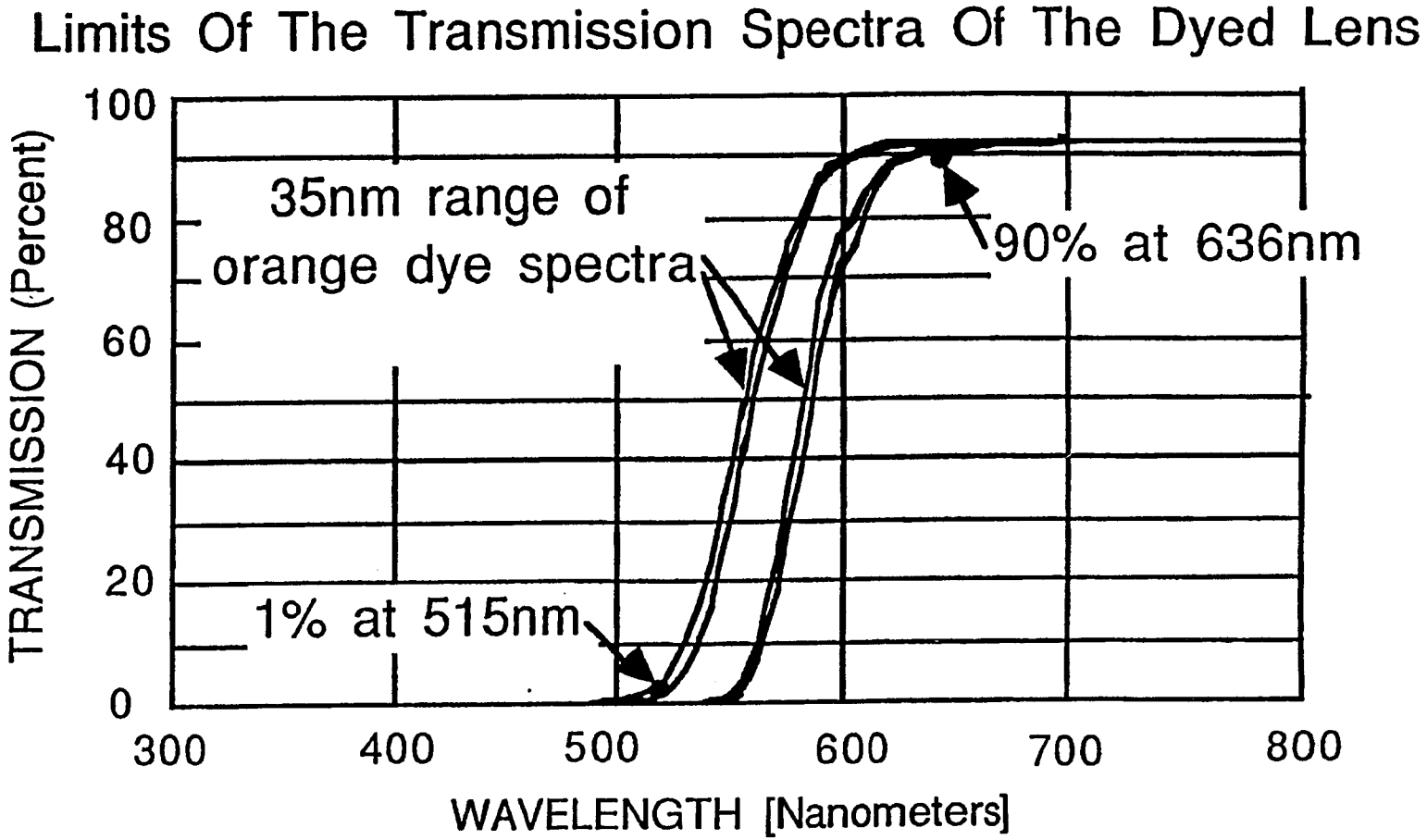
FIG. 1 is a graph depicting the limits of the transmission spectra of the dyed lens.

The best mode for carrying out the inventive lens is presented in terms of a preferred embodiment that uses a plastic lens. In the disclosure that follows, various optical terms are used to describe the lens. To facilitate the understanding of the invention, these terms are initially defined.

LENS an opthalmic lens that provides refractive correction or a lens that provides no refractive correction also known as a "plano lens".

SUNLIGHT light having the spectral characteristics of midday sunlight that has penetrated the earth's atmosphere to an elevation between sea level and 10,000 feet above sea level.

VISIBLE SUNLIGHT sunlight with wavelengths between 400 nm and 780 nm.

PHOTONS DELETERIOUS TO THE EYES violet and blue light photons which are the principal cause of senile macular degeneration (also known as "Blue Light Hazard⇆), and the ultraviolet radiation photons which are the principal cause of cateractogenisis.

HIGH VISUAL ACUITY an improved visual acuity achieved by blocking the following:

violet and blue light that is preferentially scattered by atmospheric particles;

violet and blue light that is preferentially scattered by particles within the vitreous humor of the eye;

violet and blue light that is focused in front of the retina by the simple lens of the eye;

violet and blue light during the day that preferentially bleaches the Rhodopson in the rod structure of the retina thus reducing night vision;

ultraviolet radiation that causes the lens and vitreous humor of the eye to fluores and reduce the scene contrast that is projected onto the retina.

SHARP CUT-ON DYE a dye or filter, having a cut-on slope that rises more than seven-tenths of one percent (0.7%) change in transmission for every one nonometer of increasing Wavelength change. The cut-on slope is that portion of the transmission spectral of a cut-on dye that represents the transition between substantially blocking region and the substantially transmissive region. This could be interpreted as the average slope of a line drawn between the two points referred to in the instant invention.

ELECTROMAGNETIC SPECTRUM a spectrum having a lower limit of 300 [nonometers] *nanometers* and an upper limit of 780 [nonometers] *nanometers*. The visible portion of the spectrum is further defined as falling between 400 and 780 [nonometers] *nanometers*.

TRANSMISSION the percentage of light that [is passed] *a sharp cut-on dye allows to pass* through a lens.

BLOCKING the opposite of transmission and is a measure of the percentage of light that is either reflected by the surface or surface coatings or absorbed by the dye or plastic of the lens.

SUBSTANTIALLY BLOCKING when used with reference to wavelengths, it is defined as blocking over 99 percent of the incident radiation or transmitting less than one-percent (1.0%) of the incident radiation at each and every wavelength.

The inventive lens is designed to be specifically worn in an outdoor sunlit environment. In this environment the eyes are especially susceptible to receiving photons that are deleterious to the eyes. These photons have been known to cause cateractogenisis, commonly referred to as cateracts; and senile macular degeneration. The lens substantially blocks the ultraviolet-radiation hazard which can cause cateracts and reduces the blue-light hazard which, in turn, reduces incidents of the senile macular degeneration.

Historically, humans evolved in dim forest environments and seldom ventured out into direct midday sunlight, preferring to hunt and gather food in the twilight of early morning or late evening. The inventive lens is therefore specifically designed to provide a margin of safety when humans must view objects in an unnatural bright sunlit environment.

As further proof of the need for protecting the eyes from bright sunlight, which includes blue light, is the known fact that day animals all have a blue blocking filtering means incorporated in their eyes.

Additionally, birds and reptiles that are descendants of dinosaurs, have orange oil droplets incorporated into their retinas; and mammals that have been forced to survive in bright sunlit environments have evolved other means for improving their visual acuity. For example, day ground squirrels have evolved yellow lenses in their eyes.

The inventive lens is made of a transparent, organic plastic matrix material and is suitable for making both opthalmic quality spectacle lenses and soft contact lenses. When making the spectacle lenses, a plastic made of allyl diglycol carbonate, also referred to as CR 39, is used; when making contact lenses, a class of oxygen permeable, water containing plastic matrix is generally used. The method dyeing lenses is well known in the art. Therefore, it is not described or claimed.

In all cases, the lens provide a filter barrier to the photons that are deletious to the eyes and are also transmitters of the visible light that is most useful for high visual acuity. As shown in FIG. 1, a sharp cut-on orange dye is incorporated into the lens material. The dye allows the lens to transmit at least 90% of the visible sunlight with wavelengths longer than [636] *600* nm and block more than 99% of all sunlight with wavelengths shorter than [515] *520* nm.

The transmission spectra curves of sharp cut-on orange dye, as shown in FIG. 1, are actual transmission spectra of the dispersed orange dye 3, also known as Color Index 11005, purchased from Ciba-Geigy in the form of their product known as Cebacet Orange 2R. A solvent orange dye may also be used that provides very similar sharp cut-on orange spectra. The Color Index orange solvent dye that is most commonly applied is the Ciba-Geigy Orasol Orange G.

The limitation of the invention resides within the 35 nm wide range. The curve crossing the 1% line at [515] *520* nm represents the short wavelength boundary while the curve crossing the 1% line at 550 nm represents the long wavelength boundary. The short wavelength boundary is determined by the point shown on the 1% line and the [515] *520* nm line. This short wavelength boundary is required because lenses having shorter wavelength origins i.e., less than [515] *520* nm, have been shown to allow unnecessarily large amounts of blue light transmission.

Larger amounts of blue light being to increase the blue-light hazard and reduce the visual acuity advantages inherent in the inventive lens when used in a bright sunlight environment. A further reason for the short wavelength boundary is the fact that the dispersed orange 3 dye begins to have an unacceptable ultraviolet transmission at about 385 nm.

The long wavelength boundary is determined by the requirement for adequate color verity sufficient to differentiate traffic stop signal light colors. Additionally, it has been experimentally demonstrated that the visual acuity advantage is lost to the user because of the reduction in the transmission of total light.

The short wavelength point, shown at the 1%, [515] *520* nm location, represents a minimum point that constraints the short wavelength boundary of the transmission spectra characteristics. The long wavelength point, shown at the 90%, [636] *600* nm location represents a maximum wavelength point that constraints the long wavelength boundary of the transmission spectra characteristics. Only high quality commercially available sharp cut-on orange dyes can meet these two required limits.

While the invention has been described in complete detail and pictorially shown in the accompanying drawing, it is not to be limited to such details, since many changes and modifications may be in the invention without departing from the spirit and scope thereof. Hence, it is described to cover any and all modifications and forms which may come within the language and scope of the appended claims.

What is claimed is:

1. A lens worn in front of the eyes by humans, in an outdoor sunlit environment, where said lens is a filter barrier to photons deleterious to the eyes and that is also a transmitter of visible light most useful for high visual acuity, where said lens comprises:

(a) a transparent, organic plastic matrix material, and (b) a sharp cut-on orange dye incorporated into said material that allows the lens to transmit at least 90% of the visible sunlight with wavelengths longer than [636] *600* nm and block more than 99% of all sunlight with wavelengths shorter than [515] *520* nm.

2. The lens as specified in claim 1 wherein said sharp cut-on orange dye is from the group of commercially available dyes known as Color Index Dispersed Orange Dye 3 also known as Color Index 11005.

3. The lens as specified in claim 2 wherein said sharp cut-on orange dye is Ciba-Geigy Cebacet Orange 2R.

4. The lens as specified in claim 1 wherein said sharp cut-on orange dye is from the group of commercially available dyes known as Color Index Solvent Orange Dye.

5. The lens as specified in claim 4 wherein said sharp cut-on orange dye is Ciba-Geigy Orasol Orange G.

6. The lens as specified in claim 1 wherein said lens is designed to eliminate the ultraviolet-radiation hazard which in turn, reduces incidents of cateractogenisis.

7. The lens as specified in claim 1 wherein said lens is designed to reduce the blue-light hazard which in turn, reduces incidents of senile macular degeneration.

8. The lens as specified in claim 1 wherein said lens is designed to achieve the visual acuity.

9. The lens as specified in claim 1 wherein said lens is designed for use as a spectacle lens.

10. The lens as specified in claim 1 wherein said lens is designed for use as a contact lens.

* * * * *